United States Patent [19]

Ponomarenko et al.

[11] 4,030,389
[45] June 21, 1977

[54] MACHINE FOR HIGH-SPEED PLASTIC WORKING OF MATERIALS

[76] Inventors: Nikolai Borisovich Ponomarenko, 531 mikroraion, 1a, kv. 49; Vadim Grigorievich Kononenko, ulitsa Chkalova, 15, kv. 12; Viktor Alexeevich Stelmakh, ulitsa Kirova, 18, kv. 2; Vladimir Ivanovich Kotelnikov, ulitsa Chuguevskaya, 29, kv. 39; Ivan Jurievich Valenya, ulitsa Materialisticheskaya, 27, kv. 11; Vladimir Nikolaevich Sarancha, ulitsa Kosmonavtov, 7a, kv. 71; Anatoly Avramovich Petrenko, ulitsa Borodivko, 39; Valery Pavlovich Bozhko, ulitsa Chkalova, 13, kv. 56; Sergei Vasilievich Yatsenko, Moskovsky prospekt, 204/1, kv. 36; Igor Pavlovich Komnatny, ulitsa Cheljuskintsev, 6; Levon Khachaturovich Akhnazariants, ulitsa Kospora, 23, kv. 23; Vitaly Evgenievich Strizhenko, ulitsa Osnovyanskaya, 56, kv. 2; Boris Alexeevich Kolokolov, ulitsa Kommunalnaya, 3a, kv. 9; Stanislav Anisimovich Maznichenko, ulitsa Geroev Truda, 28, kv. 188; Viktor Vasilievich Bozhko, ulitsa Chkalova, 15, kv. 206, all of, Kharkov; Oleg Alexandrovich Bondarenko, ulitsa Viktora Gjugo, 4, kv. 21, Gorlovka Donetskoi oblasti; Robert Sharafutdinovich Zakirov, ulitsa Zapadnaya 8, kv. 2, Kharkov, all of U.S.S.R.

[22] Filed: May 26, 1976

[21] Appl. No.: 690,197

Related U.S. Application Data

[63] Continuation of Ser. No. 573,258, April 30, 1975, abandoned.

[52] U.S. Cl. .................................. 83/513; 83/590; 83/618; 83/639
[51] Int. Cl.² .......................................... B26D 5/12
[58] Field of Search ........................... 83/513–519, 83/590, 618, 613, 639; 92/75

[56] References Cited

UNITED STATES PATENTS

| | | | |
|---|---|---|---|
| 1,817,070 | 8/1931 | Eksergian et al. | 83/639 X |
| 3,707,896 | 1/1973 | Kononko et al. | 83/639 |

Primary Examiner—J. M. Meister

[57] ABSTRACT

A machine provided with a bed on which is mounted a frame having an explosion chamber communicating with the space of a power cylinder whose plunger supports a punch, an anvil block located opposite to the punch and carrying a die arranged coaxially with the punch, and a device for returning the plunger to the initial position. The frame and the anvil block are rigidly secured on the bed, the space of the power cylinder is open at both ends and a hole providing communication between the space, the explosion chamber is located substantially in the middle of the length of the space, the plunger supporting the punch and a second similar plunger with a second punch being installed in the space opposite to the axis of the hole while a second anvil block is rigidly installed on the bed opposite the second punch symmetrically with the first anvil block relative to the same axis, the second anvil block being rigidly connected to the first anvil block and carrying a rigidly-secured second die. Due to the rigidity of its design, the machine ensures a higher working precision, efficiency and durability than other machines of the same type.

2 Claims, 2 Drawing Figures

MACHINE FOR HIGH-SPEED PLASTIC WORKING OF MATERIALS

This is a continuation of application Ser. No. 573,258 filed April 30, 1975, now abondoned.

BACKGROUND OF THE INVENTION

The present invention relates to the plastic working of materials and more specifically to machines for high-speed plastic working of materials by the use of energy liberated by an explosion of a working medium in a closed space and can be used to best advantage for the high-speed cutting of section steel blanks, particularly in a cold state.

PRIOR ART

Known in the prior art are machines for the plastic working of materials which comprise a frame with an internal explosion chamber chamber communicating with a power cylinder whose plunger carries a punch, and an anvil block located opposite the punch and carrying a die arranged coaxially with the punch. This machine also comprises a means for returning the frame with the anvil block and the plunger to their respective initial positions.

The frame and the anvil block are rigidly interconnected and mounted on the machine bed on roller supports which allow them to roll back together along the axis of the power cylinder towards its plunger, with this rolling-back movement arising due to the recoil occuring during the explosion of the working medium in the explosion chamber.

The workpiece is placed between the punch and the die and is subjected to a bilateral impact. In view of the fact that the plunger with the punch and the frame with the anvil block and the die have different masses, the punch and the die approach the workpiece at different speeds so that the workpiece has to be installed outside the die. It follows from the above that the major disadvantage of the known machine resides in the impossibility of securing the workpiece in the die and, consequently, the impossibility of ensuring high precision in working the blanks of a complex shape.

In addition, as the machine frame is subjected to impact loads due to recoil, all the units mounted on the frame (explosion chamber with bypass device, admission and decompression valves and piping) are likewise subjected to impact loads which reduces their service life and calls for an unjustified complication of their design.

Finally, at a given output, the known machines have comparatively large dimensions and lack in rigidity which ensures from their engineering layout.

OBJECT AND SUMMARY OF THE INVENTION

An object of the present invention is to provide a machine for the high-speed plastic working of materials utilizing the energy of explosion with such a layout design as to ensure an accurate setting of the workpieces and consequently, the working of blanks with a complex shape.

Another object of the invention is to eliminate the effect of impact loads on the machine frame and units and pipes mounted thereon thereby prolonging their life.

Still another object of the invention is to increase the efficiency of the machine as a whole.

These and other objects are accomplished by providing a machine for the high-speed plastic working of materials utilizing the energy of explosion in which a bed mounts a frame having an explosion chamber communicating with the space of a power cylinder whose plunger carries a punch, an anvil block is located opposite to the punch and supports a die arranged coaxially with the punch, and a device is provided for returning the plunger to the initial position. According to the invention, the frame and the anvil block are rigidly secured on the bed, the space of the power cylinder is open at both ends and a hole or bore providing communication between the said space and the explosion chamber is located substantially in the middle of the length of the space, the plunger with the punch and a second similar plunger with a second punch being installed in the space opposite to the axis of the hole while a second anvil block is rigidly installed on the bed opposite to the second punch symmetrically with the same axis, the second anvil block being rigidly connected to the first anvil block and supporting a rigidly-secured second die installed coaxially with the second punch.

Due to such an arrangement, the frame with the explosion chamber and the anvil blocks with the dies remain stationary in the course of operation which allows the workpiece to be located directly in the die whereby the working accuracy is greatly enhanced. This, in turn, makes it possible to handle blanks of a more complex shape.

Moreover, such an arrangement doubles the efficiency of the machine with but a small increase in its length and, particularly for the cold cutting of section steel, it allows the cutting operation to be performed on a two-phase principle in which the punch cuts a narrow strip from the workpiece along two parallel cutting planes so that the parts of the workpiece being cut remain stationary thus eliminating their deformation caused by inertia loads and produces blanks of an accurate length and a high precision of cut.

It is practicable that the anvil blocks be interconnected by means of substantially horizontal columns freely passing through holes in the frame. Such a design eliminates the impact loads on the frame and the explosion chamber with its units and pipes which improves the conditions of their operation, extends their life and allows the use of units of a simpler design than the previously known ones of the same type and reduces the cross-sectional dimensions of the machine.

The invention will now be described in detail by referring to one of the possible versions of its realization, particularly a horizontal machine for cold-cutting blanks of section steel utilizing the energy of explosion of a gas-air mixture with reference to the accompanying drawings, in which:

DETAILED DESCRIPTION OF THE MACHINE

Figure 1:
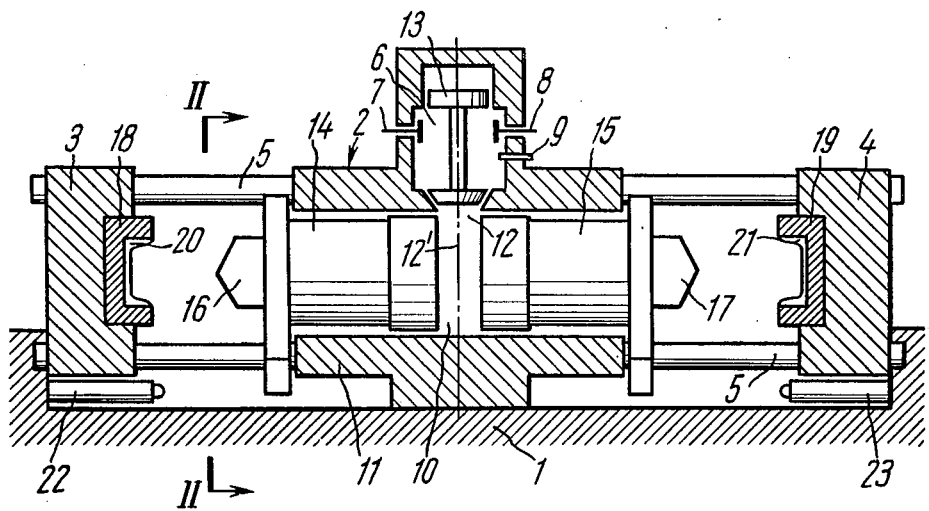
FIG. 1 is a view partly in longitudinal section and partly in elevation of the horizontal machine for cutting blanks, according to the invention, in the initial position.
Figure 2:
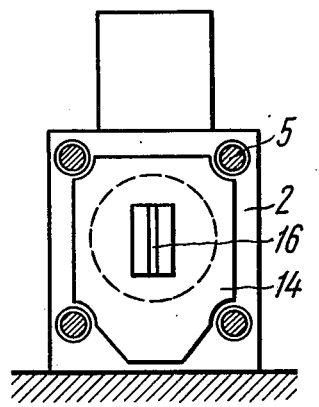
FIG. 2 is a section taken along line II—II in FIG. 1, the view looking in the direction of the arrows.

The machine for cutting section-steel utilizing the energy of explosion comprises a horizontal bed 1 and a frame 2 is (FIG. 1) rigidly mounted thereon. On both sides of the frame and at equal distances therefrom, two anvil blocks 3 and 4 are mounted on the frame 1. The anvil blocks 3 and 4 are constituted by vertically-set plates rigidly interconnected with each other by four substantially horizontally extending columns 5 which pass freely through holes in the frame 2.

An explosion chamber 6 located in the upper portion of the frame 2 is provided with a decompression valve 7, an admission valve 8 and a spark plug 9 installed in the chamber walls.

Located in the frame 2 below the explosion chamber 6 is a space 10 of a horizontally-arranged power cylinder 11, and the space 10 is open at both ends, i.e. on the ends facing the anvil blocks 3 and 4 the space 10 communicates with the explosion chamber 6 through a hole or bore 12 which is provided with a bypass device 13. Axis 12' of the hole 12 is located, substantially in the middle of the length of the space 10 of the power cylinder 11 two similar plungers 14 and 15 are installed in the space 10 on opposite sides of the axis 12' of the hole 12. The plungers 14 and 15 support punches 16 and 17, respectively, on their ends facing the anvil blocks; 3 and 4. The punches 16 and 17 are identical in size.

The anvil blocks 3 and 4 are provided with rigidly-secured dies 18 and 19 respectively which are set coaxially with the corresponding punches 16 and 17 with the dies holding blanks 20 and 21 respectively to be cut.

The bed 1 also mounts two hydraulic cylinders 22 and 23 adapted to return the plungers 14 and 15 with their punches 16 and 17 to the initial position.

The explosion chamber 6 is connected by a pipe with a source (not shown) of a working medium, with the working medium being selected to suit the actual conditions of operation. The working media can be constituted by mixtures of natural or artificial gases with air, gasoline-air mixtures, as well as gun powder, etc.

The working cycle of the machine commences when both dies 18 and 19 are fed with the workpieces 20 and 21 respectively in a direction perpendicular to the plane of the drawing in FIG. 1.

Then, the explosion chamber 6 is disconnected from the space 10 of the power cylinder 11 by closing the hole 12 with the bypass device 13; the chamber 6 is cut off by the decompression valve 7 from the atmosphere and is put in communication with the source of a gas-air mixture, via admission valve 8.

As soon as the explosion chamber 6 is charged with an accurately metered amount of the gas-air mixture, the mixture is exploded by the spark plug 9. The gases liberated by the explosion, flow at a high pressure through the opened hole 12 into the space 10 of the power cylinder 11 between the plungers 14 and 15. Under the effect of these gases the plungers 14 and 15 with the punches 16 and 17 start moving in synchronism at an ever-increasing speed in opposite directions towards the anvil blocks 3 and 4 respectively.

At the end of the stroke of the plungers 14 and 15, the punches 16 and 17 cut synchronously the blanks 20 and 21 located in the dies 18 and 19 respectively.

The reaction of the cutting force is taken by the horizontal columns 5 which interconnect the anvil blocks 3 and 4 while the frame 2 bears no impact loads since the columns 5 pass freely through the holes in the frame.

Now, the decompression valve 7 places the explosion chamber 6 in communication with the atmosphere and the waste gases are exhausted from the chamber 6. Then, the hydraulic cylinders 22 and 23 are activated, their rods come to bear against the external surfaces of the plungers 14 and 15 and retrun the plungers to the initial position.

The waste gases are discharged by the plungers 14 and 15 from the space 10 through the hole 12 into the chamber 6 and further, through the decompression valve 7, into the atmosphere.

The cut blanks 20 and 21 are withdrawn from the dies 18 and 19 and the machine is ready for the next working cycle.

The machine for cold-cutting section steel, according to the invention, features a higher efficiency than the known machines of the same type, is more compact and sturdy and the frame 2 with the explosion chamber 6, units and pipes, bears no impact loads which has made it possible to simplify the design of the machine and improve its durability and reliability.

The possibility of precise setting of the workpieces 20 and 21 in the fixed dies 14 and 15 ensures precision of operation and thus provides for handling blanks of a complex shape.

All these advantages make for the high technical and economical characteristics of the machine according to the invention.

The invention is not to be confined to any strict conformity to the showings in the drawings but changes or modifications may be made therein so long as such changes or modifications mark no material departure from the spirit and scope of the appended claims.

We claim:

1. A machine for high-speed plastic working of materials utilizing the energy of explosion comprising:
   a. a bed;
   b. a frame rigidly secured on said bed, said frame having an explosion chamber and a power cylinder space, said space being open at both ends and a hole having an axis located substantially in the middle of the length of said space providing communication between the space and the explosion chamber;
   c. two similar plungers mounted in the power cylinder space opposite to the axis of said hole and moving in synchronism in opposite directions under the force of high-pressure gases liberated by an explosion of a working medium in said explosion chamber and entering said power cylinder space through said hole;
   d. two similar punches secured on said plungers opposite to each other;
   e. two similar anvil blocks, each block being rigidly secured on said bed opposite to one of said punches symmetrically with the other of said anvil blocks relative to the axis of said hole and rigidly connected therewith;
   f. two similar dies, each die being rigidly secured on one of said anvil blocks opposite to and coaxially with the respective punch;
   g. and means for returning said plungers with said punches to the initial position.

2. The machine according to claim 1 in which the anvil blocks are interconnected by substantially horizontally extending columns which pass freely through corresponding holes provided in the frame.

* * * * *